United States Patent
Kozono et al.

(10) Patent No.: US 9,581,501 B2
(45) Date of Patent: Feb. 28, 2017

(54) TEMPERATURE CONTROL MATERIAL

(71) Applicant: NiGK CORPORATION, Kawagoe-shi, Saitama (JP)

(72) Inventors: Naoki Kozono, Kawagoe (JP); Katsumi Nakasato, Kawagoe (JP)

(73) Assignee: NiGK CORPORATION, Kawagoe-shi, Saitama (JP)

( * ) Notice: Subject to any disclaimer, the term of this patent is extended or adjusted under 35 U.S.C. 154(b) by 0 days.

(21) Appl. No.: 15/028,216

(22) PCT Filed: Nov. 8, 2015

(86) PCT No.: PCT/JP2015/072750
§ 371 (c)(1),
(2) Date: Apr. 8, 2016

(87) PCT Pub. No.: WO2016/035523
PCT Pub. Date: Mar. 10, 2016

(65) Prior Publication Data
US 2016/0290871 A1    Oct. 6, 2016

(30) Foreign Application Priority Data

Sep. 2, 2014 (JP) .................. 2014-177996

(51) Int. Cl.
*G01K 1/02* (2006.01)
*G01K 11/06* (2006.01)
(Continued)

(52) U.S. Cl.
CPC .................. *G01K 1/02* (2013.01); *B32B 7/12* (2013.01); *G01K 11/06* (2013.01); *H01H 37/76* (2013.01);
(Continued)

(58) Field of Classification Search
CPC ....... G01K 1/02; G01K 11/06; B23B 2519/00
(Continued)

(56) References Cited

U.S. PATENT DOCUMENTS 6,042,264 A * 3/2000 Prusik .................. G01K 3/04
116/219
6,614,728 B2 * 9/2003 Spevacek ............. G01K 3/04
116/216
(Continued)

FOREIGN PATENT DOCUMENTS

JP     2003-065862 A    3/2003
JP     2008520962 A     6/2008
(Continued)

OTHER PUBLICATIONS

International Search Report of PCT/JP2015/072750, mailed Nov. 2, 2015.

*Primary Examiner* — Lisa Caputo
*Assistant Examiner* — Philip Cotey
(74) *Attorney, Agent, or Firm* — Collard & Roe, P.C.

(57) ABSTRACT

A sensitive and practicable temperature control material which precisely or determinably detects whether the temperature reaches a predetermined temperature by electrical change from a conductive state to an insulated or lower-conductive state has excellent time stability, chemical stability, durability, and weather resistance. The temperature control material includes a heat-melt substance which melts by heat at a melting point according to temperature being detected, and a conductive paste which includes conductive powder. The temperature control material is in a conductive state by the conductive paste. The heat-melt substance is kept away from the conductive paste through a porous material and the temperature control material changes to be in an insulated or lower-conductive states. The heat-melt
(Continued)

substance penetrates the porous material to irreversibly permeate and/or disperse into the conductive paste on a heat-melt state thereof.

8 Claims, 6 Drawing Sheets

(51) Int. Cl.
   *H01H 37/76* (2006.01)
   *B32B 7/12* (2006.01)
(52) U.S. Cl.
   CPC ..... *B32B 2307/202* (2013.01); *B32B 2519/00* (2013.01); *H01H 2037/769* (2013.01)
(58) Field of Classification Search
   USPC ............... 374/102, 16, 183, E3.004, E7.001
   See application file for complete search history.

(56) References Cited

U.S. PATENT DOCUMENTS

| | | | | |
|---|---|---|---|---|
| 7,275,863 | B1* | 10/2007 | Akers | G01K 11/06 116/216 |
| 8,833,292 | B2* | 9/2014 | Bower | G01K 3/04 116/207 |
| 2001/0027741 | A1* | 10/2001 | Qiu | G01K 3/04 116/207 |
| 2003/0129379 | A1* | 7/2003 | Yao | B29C 41/12 428/308.4 |
| 2007/0085062 | A1* | 4/2007 | Gordon | G01K 3/005 252/512 |
| 2008/0187021 | A1 | 8/2008 | Haarer et al. | |
| 2010/0296545 | A1* | 11/2010 | Haarer | G01N 31/229 374/102 |
| 2012/0295052 | A1* | 11/2012 | Choi | B32B 5/022 428/40.9 |
| 2013/0224875 | A1 | 8/2013 | Haarer et al. | |
| 2014/0154808 | A1* | 6/2014 | Patel | G01K 3/04 436/1 |
| 2014/0311400 | A1* | 10/2014 | Park | A61L 2/28 116/216 |
| 2015/0308901 | A1* | 10/2015 | Salman | G01K 3/04 374/102 |

FOREIGN PATENT DOCUMENTS

| | | |
|---|---|---|
| JP | 2011-216221 A | 10/2011 |
| JP | 5395288 B1 | 1/2014 |

\* cited by examiner (a)

(b)

(c)

(a)

(b)

(c)

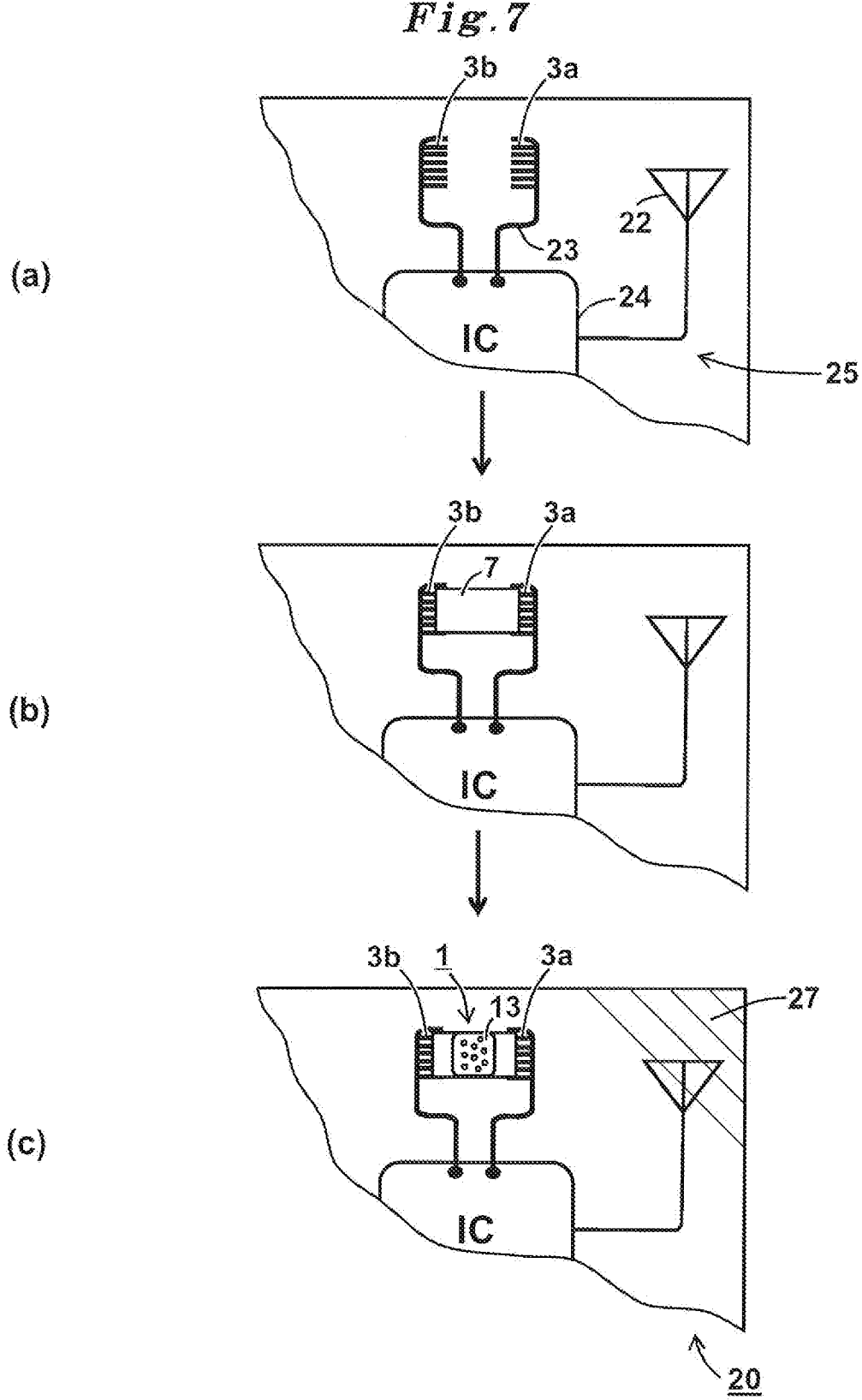

TEMPERATURE CONTROL MATERIAL

CROSS REFERENCE TO RELATED APPLICATIONS

This application is the National Stage of PCT/JP2015/072750 filed on Aug. 11, 2015, which claims priority under 35 U.S.C. §119 of Japanese Application No. 2014-177996 filed on Sep. 2, 2014, the disclosures of which are incorporated by reference. The international application under PCT article 21(2) was not published in English.

TECHNICAL FIELD

The present invention relates to a temperature control material which can electrically determine whether temperature reaches the predetermined temperature or not by change from a conductive state to an insulated or lower-conductive state.

BACKGROUND OF THE INVENTION

As a heat sensitive material for controlling temperature which determines whether the temperature reaches the predetermined temperature or for determining hysteresis of the temperature visually, a irreversible heat sensitive label is used heretofore. The heat sensitive label is formed by printing a heat-melt substance of a heat sensitive agent on a colored paper material. According to the heat sensitive label, the heat-melt substance melted by heat at predetermined temperature or more makes transparent or is absorbed into a paper material. Thereby, shielded color of the paper material is appeared and changes its hue to detect whether temperature reaches the predetermined temperature. Thus heat sensitive material can determine a result of the over-heated temperature than predetermined temperature under daylight condition simply and visually. However, it is unsuitable to control the temperature at a specific place such as dark, altitude, sealed or closed places, because it is hard to determine the hue visually.

An temperature control material which can control whether the temperature reaches the predetermined temperature or can determine hysteresis of the temperature without visual observation, is desired. For example, temperature control materials, which can detect it by electric procedures, have been developed. As thus temperature control materials, Patent Document 1 discloses a temperature control material wherein a heat-melt substance and a conductive paste including conductive powder are contacted and/or contiguous each other. According to this temperature control material, the heat-melt substance is melted by heat at temperature being detected, and then a conductive state thereof changes to be in an insulated or lower-conductive state. By using thus change, it can electrically detect whether the temperature reaches the predetermined temperature in order to control the temperature.

This temperature control material changes the conductive state to the insulated or lower-conductive state, by permeating the melted heat-melt substance by heat into the conductive paste and swelling the conductive paste. However, the heat-melt substance and the conductive paste in this temperature control material are contacted, and thereby the heat-melt substance gradually migrates and permeates into the conductive paste and makes the conductive paste swell. The conductivity of this temperature control material deteriorates with time as exceptionable phenomenon, even if it is not over the predetermined temperature. Since this temperature control material can be not used for long time stably, it has some problems of a short effective term or poor practicality. And metal powder used for the conductive paste is easy to cause decomposition by oxidation or sulfurization, and the conductivity is variable easily. Therefore this temperature control material is difficult to use in a hostile condition such as hot or humid conditions. Furthermore, in some case where the melted heat-melt substance by heat at the predetermined temperature or more indicates low viscosity, the heat-melt substance may flow out from the conductive paste and may not permeate or disperse into the conductive paste and the conductive paste may not swell sufficiently. Consequently, even if the temperature reaches the predetermined temperature, the conductivity thereof does not decrease and the temperature control material cannot detect it.

Therefore, a temperature control, material, which improves the problems and has more practicality and can determine whether the temperature reaches the predetermined temperature or can determine hysteresis of the temperature electrically to control it, is desired.

PRIOR ART DOCUMENT

Patent Document

Patent Document 1: JP Patent Publication No. 5395288B

SUMMARY OF THE INVENTION

Problems to be Solved by the Invention

The present invention was made in view of solving the above described problems. And its object is to provide a sensitive and practicable temperature control material which precisely or determinably detects whether the temperature reaches the predetermined temperature by electrical change from a conductive state to an insulated or lower-conductive state and has excellent time stability, chemical stability, durability, and weather resistance. And another object is to provide a thermosensor tag using the temperature control material.

Means for Solving the Problems

A temperature control material of the present invention developed to achieve the objects above described comprises a heat-melt substance which melts by heat at a melting point according to temperature being detected, and a conductive paste which includes conductive powder, the temperature control material is in a conductive state by the conductive paste, where the heat-melt substance is kept away the conductive paste through a porous material, and the temperature control material changes to be in an insulated or lower-conductive state, where the heat-melt substance penetrates the porous material to irreversibly permeate and/or disperse into the conductive paste on a heat-melt state thereof.

In the temperature control material. It is preferable that the porous material is provided onto a layered adhesive material on the conductive paste, and the heat-melt substance is stacked thereon.

In the temperature control material, a thermosensitive ink layer including the heat-melt substance and a paste layer formed by the conductive paste may be kept away through the porous material and piled each other.

In the temperature control material, it is preferable that the porous material is a paper material, an inorganic material, or a plastic material.

In the temperature control material, it is preferable that the conductive powder is at least one selected from carbon black powder and carbon nanotube powder.

In the temperature control material, it is preferable that the heat-melt substance is at least one selected form an, aliphatic acid derivative, an aromatic carboxylic acid derivative, an alcohol derivative, an ether derivative, an aldehyde derivative, a ketone derivative, an amine derivative, an amide derivative, a nitrile derivative, a hydrocarbon derivative, an aromatic compound, a thiol derivative, and a sulfide derivative.

In the temperature control material, it is preferable that a resin for forming the paste included in the conductive paste is at least one selected from a cellulose-type resin, an acryl-type resin, an epoxy resin, a vinyl-type resin, an imide-type resin, an amide-type resin, a butyral-type resin, a nylon-type resin, and a rubber-type compound.

A thermosensor tag of the present invention developed to achieve the objects above described comprises the temperature control material mounted onto circuit, terminals of an individual identification tag.

Effects of the Invention

The temperature control material of the present invention can electrically detect whether the temperature reaches the predetermined temperature by change from a conductive state to an insulated or lower-conductive state. In the temperature control material, the porous material is provided between the heat-melt substance which melts by heat at predetermined temperature and the conductive paste. Since they are not directly contacted and are spatially kept away each other, it is prevented that the heat-melt substance migrates into the conductive paste unexpectedly. If a heat-melt substance migrates, the conductivity thereof may gradually deteriorate with time. However, the temperature control material can prevent to unexpectedly deteriorate the conductivity thereof below the predetermined temperature. Therefore the temperature control material has excellent time stability, chemical stability, durability, and weather resistance, and can be stably used for long time.

When the heat-melt substance melted by heat at the predetermined temperature or more is absorbed into the porous material through capillarity, it can contact with the conductive paste and can permeate and disperse thereinto sufficiently. When the temperature control material is just heated at predetermined temperature or more, it changes the conductive state to an insulated or lower-conductive state absolutely and can precisely or determinably detect the predetermined temperature sensitively or can control the temperature.

When the conductive powder included in the conductive paste is carbon black powder or carbon nanotube powder except for metal powder, the temperature control material achieves excellent durability and weather resistance. And when the temperature control material is used under a hostile condition such as warmed, or hot and humid conditions, it does not decompose or deteriorate. The temperature control material can prevent to unexpectedly deteriorate the conductivity thereof under any affected conditions.

The temperature control material is useful and has excellent time stability, chemical stability, durability, and weather resistance. Since the temperature control material can sensitively detect the temperature precisely and determinably, it can be used for various purposes. It may be used for a thermal fuse as a trigger for stopping various operating circuits or a sensor tag for thermo-control combined with a radio-frequency identification device (RFID) tag.

Although general temperature control materials control the temperature by detecting electrical change from a conductive state to an insulated or lower-conductive state, it easily causes the electrical change by deterioration of conductivity through a little migration into a conductive paste. Therefore it is necessary that temperature control materials in general detects temperature determinably and has secure accuracy with no occurrence of migration below predetermined temperature.

When the conductive paste, the adhesive material, the porous material, and the heat-melt, substance in the temperature control material of the present, invention are piled in order, the conductive paste is kept away from the heat-melt substance and further the conductive paste and the heat-melt substance have a physical barrier by the adhesive material and the porous material therebetween. The temperature control material can prevent unexpected migration of the heat-melt substance below predetermined temperature due to synergistic effects by them. The heat-melt substance may migrate and permeate with time below predetermined temperature into the porous material which easily absorbs it by capillarity. The heat-melt substance can be interrupted to be penetrated into the porous material by the adhesive material which has lower permeation property or penetration property than ones of the porous material, although the melted heat-melt substance by heat may be easily penetrate into the porous material. Therefore unexpected migration of the heat-melt substance into the conductive paste can be prevented, certainly by their order. Furthermore, since the heat-melt substance contacts with the porous material, the fluent heat-melt substance melted by heat at the predetermined temperature or more is sufficiently absorbed into the porous material without flowing out thereof. Additionally, since the conductive paste is swelled to induce the insulated or lower-conductive state after penetration and dispersion thereof into the porous material and following permeation and penetration thereof into the adhesive material, the temperature control material does not make the conductivity deteriorate.

The thermosensor tag of the present invention change the conductive state to the insulated or lower-conductive state electrically, only when the temperature becomes the predetermined temperature being controlled by the temperature control material. The change is displayed in a reader/writer by using radio waves to detect it, and the temperature control material can control whether temperature reaches the predetermined temperature or not.

BRIEF DESCRIPTION OF DRAWINGS

FIG. 7 is an outline view showing manufacturer processes of the thermosensor tag of the present invention.

MODE FOR CARRYING OUT THE INVENTION

Hereunder, embodiments to practice the present invention will be explained in detail, but the scope of the present invention is not restricted by these embodiments.

Figure 1:
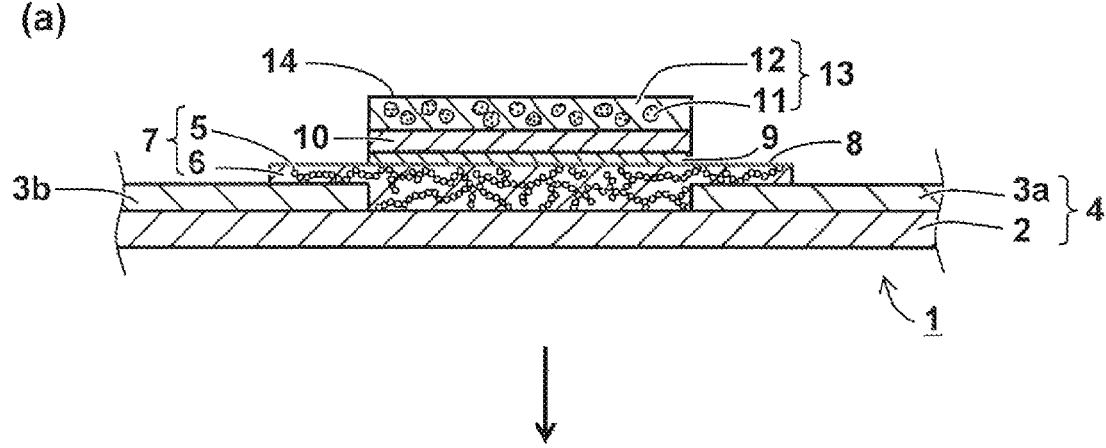
FIG. 1 is a schematic cross-section view showing usage states of the temperature control material of the present invention with time.
Figure 1:
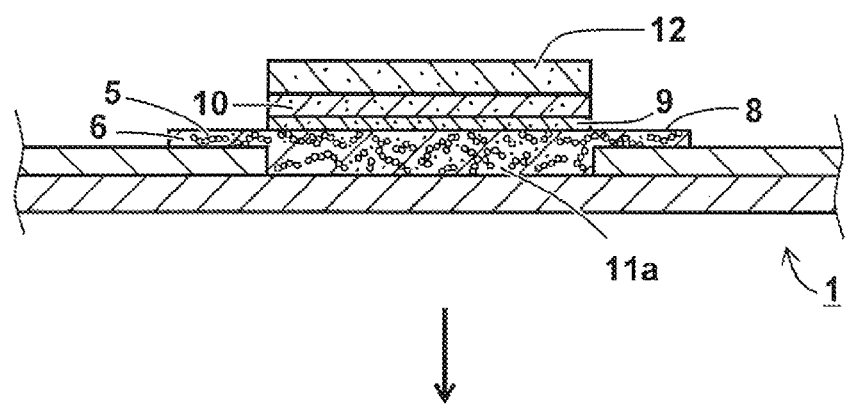
Figure 1:
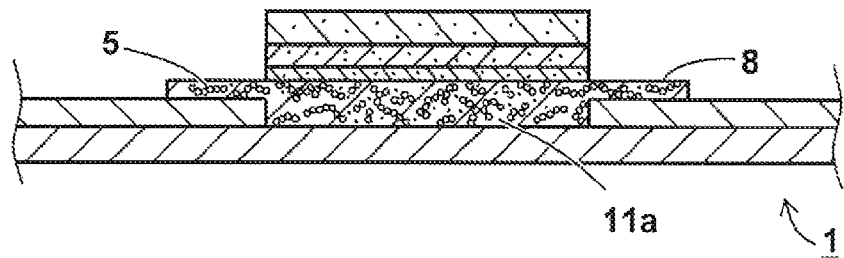

A temperature control material of the present invention is explained detail by referring FIG. 1 showing one embodiment thereof. FIG. 1 is a schematic cross-section view showing change of usage states in of the temperature control material 1. FIG. 1(a) shows a state below predetermined temperature, FIG. 1(b) shows a state at the predetermined temperature or more, and FIG. 1(c) shows a state below the predetermined temperature after cooling.

When the temperature control material 1 does not have hysteresis at the predetermined temperature or more, a heat-melt substance 11 and a conductive paste 7 are kept away through a porous material 10. When the temperature is at the predetermined temperature or more being detected, a heat-melt substance 11a melted by heat in the temperature control material 1 penetrates the porous material 10 and permeates and/or disperses into the conductive paste 7, and then makes the conductive paste 7 swell. The temperature control material 1 changes a conductive state to an insulated or lower-conductive state irreversibly. The temperature control material 1 can determine whether temperature reaches the predetermined temperature or not by electrical change thereof.

In the temperature control material 1, a paste layer 8 formed from the conductive paste 7 including conductive powder 5 and a resin 6 for forming the paste is provided over circuit terminals 3a, 3b of a substrate 4 where an electronic circuit on a base material 2 is formed, and a adhesive material 9 as a provided layer and a porous material 10 as a formed layer are piled on the paste layer 8, and a thermosensitive ink layer 14 formed by a thermosensitive ink 13 including a powdery heat-melt substance 11 and an ink vehicle 12 is stacked and piled on the porous material 10 in this order. The paste layer 8 formed from the conductive paste 7 has conductivity, because the respective conductive powder 5 in the resin 6 for forming the paste has junctions each other so as to be conductive. In the thermosensitive ink layer 14 formed by the thermosensitive ink 13, the granular, powdery or aggregated solid heat-melt substance 11 is dispersed in the ink vehicle 12.

As regards the temperature control material 1, the circuit terminals 3a, 3b of an electronic circuit on the base material 2 is covered by the paste layer 8, and the respective conductive powder 5 has the junctions each other and indicates a conductive state under a lower temperature condition than the predetermined temperature at which the heat-melt substance 11 is melted by heat.

When the temperature of the temperature control material is over the predetermined temperature after heating, the solid heat-melt substance 11 becomes a fluent melted heat-melt substance 11a through melting by heat and then dispersed into the ink vehicle 12, as shown in FIG. 1(b). A part or all of the melted heat-melt substance 11a having fluidity through melting by heat is absorbed or permeated into the porous material 10 by capillary thereof, and then is dispersed into the below layered adhesive material 9 to be permeated or dispersed into the paste layer 8. Thus heat-melt substance 11a, which penetrates the porous material 10 and the adhesive material 9 and then permeates and disperse into the paste layer 8, makes the resin 6 for forming the paste swell and infiltrates between the respective conductive powder 5 to remain in the paste layer 8. The respective conductive powder 5 included in the paste layer 8 loses the junctions thereof by the swelled resin 6 for forming the paste, in consequence the temperature control material 1 indicates an insulated or lower-conductive state.

The temperature control material 1 increase electrical resistance by change from the conductive state to the insulated or lower-conductive state. According to it, when an electrical resistance value is measured, the temperature control material 1 can determine whether temperature reaches the predetermined temperature by detecting a little or infinite increment of the electrical resistance.

The permeated melted heat-melt substance 11a does not restore previous junctions of the respective conductive powder 5, and stays in the paste layer 8 irreversibly. Therefore the insulated or lower-conductive state is kept, even if the temperature is declined or get back to cooler conditions than predetermined temperature again, as shown in FIG. 2(c). Therefore, if the insulated or lower-conductive state is measured, the temperature control material can determine hysteresis when the temperature reaches the predetermined temperature.

The thermosensitive ink layer 14 includes the heat-melt substance 11, the ink vehicle 12 in which the melted heat-melt substance 11 by heat can dispersed, if necessary coloring matter such as pigment and dye. When the temperature control material 1 includes the coloring matter, the hysteresis when the temperature reaches the predetermined temperature can be determined by the electrical change of the insulated or lower-conductive state and visible change of hue thereof. It is preferable that the thermosensitive ink layer 14 includes 10-99% weight % of the heat-melt substance 11.

The heat-melt substance 11 is an ingredient for defining the temperature being determined, and has melting, point of the temperature being determined. When the heat-melt substance 11 is heated at or over the melting point to be melted, it changes from a granular, powdery or aggregated state of solid to a fluent state. Examples of the thermofusible substance 11 include fatty acid derivatives and aromatic carboxylic acid derivatives such as myristic acid, palmitic acid, adipic acid, octanoic acid, tricosanoic acid, tetratriacontanoic acid, 2,3-dimethylnonanoic acid, 23-methyltetracosanoic acid, 2-hexenoic acid, brassidic acid, 2-methyl-2-dodecenoic acid, β-eleostearic acid, stearic acid, behenolic acid, cis-9,10-methyleneoctadecanoic acid, chaulmoogric acid, n-dodecyl 3,3'-thiodipropionate trilaurin, palmitic acid anilide, stearic acid amide, zinc stearate, salicylic acid anilide, N-acetyl-L-glutanic acid, caproic acid-β-naphthylamide, cnanthic acid phenylhydrazide, p-chlorophenacyl arachionate, cholesteryl formate, 1-aceto-2,3-distearin, n-pentadecyl thiolaurate, stearic acid chloride, palmitic anhydride, stearic acid-acetic acid anhydride, succinic acid, sebacic acid benzyl ammonium salt, 2-bromovaleric acid, α-sulfostearic acid methyl sodium salt, 2-fluoroarachic acid, behenic acid, myristic acid anilide, palmitamlide, stearylanilide, and behenic acid amide; alcohol derivatives such as dodecyl alcohol; ether derivatives such as dihexadecyl ether, dioctadecyl ether, cytidine, adenosine, sodium phenoxyacetate, 1,3-bis(4-hydroxyphenoxy)benzene and aluminum ethoxide; aldehyde derivatives such as stearyl aldehyde, paralauryl aldehyde, para stearyl aldehyde, naphthaldehyde, p-chlorobenzaldehyde, phthalaldehyde, and 4-nitrobenzaldehyde; ketone derivatives such as stearone, doeosane-2-one, phenyl heptadecyl Ketone, cyclononadecane, vinyl heptadecyl ketone, 4,4'-bis dimethylamino benzophenone, benzyl, bis(2,4-pentanedionato)calcium, and 1-chloro anthraquine; amine derivatives such as tricosylamine, dioctadecyiamine, N,N-dimethyl octylamine, heptadeca methyleneimine, naphthylamine, ethyl p-aminobenzoate, o-tolylthiourea, sulfamethazine, guanidine nitrate, p-chloroaniline, and propylamine hydrochloride; amide derivatives such as hexylamide, octacosylamide, N-methyl dodecylamide, N-methyl heptacosylamide, α-cyanoacetamide, salicylamide, dicyandiamide, 2-nitrobenzamide, and N-bromoacctamnide; nitrite derivatives such as pentadecane nitrite, margaronitrile, 2-napthonitrile, o-nitro phenoxy acetic acid, 3-bromobenzonitrile, 3-cyanopyridine, and 4-cyanophenol; hydrocarbon derivatives such as hexadecane, 1-nonatriacontene, trans-n-2-octadecene, hexatriacontylbenzene, 2-methylnaphthalene, picene, cyanuric chloride, 1-fluorononadecane, 1-chloroeicosane, 1-iodopentadecane, 1-bromoheptadecane, and 1,2,4,5-tetrakis(bromomethyl)benzene; aromatic compounds such as thymol, bibenzyl, o-terphenyl, 3,5-dimethyiphenol, 3,4-dimethylphenol, 2,3-dimethylphenol, 2,5-dimethyl phenol, benzhydrol, 4-ethoxyphenol, phenyl benzoate, 8-quinolinol, dimethyl isophthalate, diphenyl phthalate, diphenyl carbonate, salicyl alcohol, acetoacetanilide, p-tolylacetic acid, 4-methoxybiphenyl, 2-(4-hydroxyphenyl)ethanol, propyl 4-hydroxybenzoate, 2,3,5-trimethylphenol, and phenyl 1-hydroxy-2-naphthoate; thiol derivatives such as pentadecane thiol, eicosane thiol, 2-naphthalene thiol, 2-mercaptoethyl ether, and 2-nitrobenzene sulfenyl chloride; sulfide derivatives such as 1,3-dithiane, 2,11-dithin [3,3]paracyclophane, bis(4-hydroxy-3-methylphenyl) sulfide, 4,4'-dipyridyl sulfide, and 4-methyl mercapto phenol. Those examples of the heat-melt substance 11 may be used solely or used plurally as mixture thereof.

Although the ink vehicle 12 in the thermosensitive ink layer 14 does not solve or disperse the heat-melt substance 11 before melting by heat or the optional coloring matter, it can disperse the melted heat-melt substance 11a after melting by heat. Examples of the ink vehicle 12 include acrylic resin, phenol resin, nylon, ethyl cellulose, hydroxymethyl cellulose, polyvinyl alcohol, and carboxymethyl cellulose. It may be a commercially available Ink vehicle, which is AS800 Medium (available from JUJO CHEMICAL CO., LTD.) and High Set Mat Medium (available from MINO GROUP CO., LTD.). Examples of the ink vehicle 12 are a silicone-type resin, an epoxy-type resin, an amino-type resin, an urethane-type resin, an urethane acrylate-type resin, an epoxy acrylate-type resin, an ether acrylate-type resin, an alkyd-type resin, a vinyl acetal-type resin, an acryl-type polyester, and an arcyl-type ultraviolet-curable resin. As the commercially available ink vehicle, it is possible to use DAICURE AK (available from Dainippon Ink and Chemicals), FDS New (available from Toyo Ink Manufacturing Co., Ltd.), Raycure TU 4400 (available from JUJO CHEMICAL. CO., LTD.), UV SPA clear (available from Teikoku Printing Inks Mfg. Co., Ltd), and UV8418 (available from Seiko advance Ltd.).

The coloring matter included in the thermosensitive ink layer 14 is granular or powdery and can be dispersed or solved in the heat-melt substance melted, by heat to diffuse thereinto. Examples of the coloring matter are dye such as a direct dyestuff, an acidic dyestuff, a basic dyestuff, a dispersed dye, a reactive dyestuff, an oil soluble dyestuff, a vat dyestuff, a mordant dyestuff, an azoic dyestuff, and a sulfide dyestuff; pigment such as an organic pigment and an inorganic pigment; and colorant. The coloring matters of variety may be used. Those coloring matters may be used plurality it is preferable that the coloring matter has particle diameter of 0.001 μm-5 mm. And it is preferable that 0.001-100 parts by weight of the coloring matter is included to 100 parts by weight of the heat-melt substance in the thermosensitive ink layer 14.

The thermosensitive ink layer 14 may include a dispersant such as talc, magnesium carbonate and silica; a coloring auxiliary having a contrasting hue against a coloring matter hue in which amplifies change of the hue; wax for controlling fluidity or drying characteristics; a surface acting agent, if the effects of the present invention is prevented.

The heat-melt substance 11, the ink vehicle 12 which can be dispersed in the heat-melt substance melted by heat, and the optional coloring matter are kneaded to prepare the thermosensitive ink 13. After that the thermosensitive ink 13 is applied or printed and dried, the thermosensitive ink layer 14 can be produced.

The paste layer 8 includes the conductive powder 5 and the resin 6 for forming the paste to invest conductivity characteristics. On another front, the paste layer 8 indicates the insulated or lower-conductive state, when the melted heat-melt substance 11a by heat permeates or disperses thereointo to be non-conductive mixture including the melted heat-melt substance 11a.

The conductive powder 5 included in the paste layer 8 is preferably powder having carbon-structure. For example, carbon black powder and carbon nanotube powder are exemplified.

As the resin 6 for forming the paste included in the paste layer 8, a cellulose-type resin, an acryl-type resin, an epoxy resin, a vinyl-type resin, an imide-type resin, an amide-type resin, a butyral-type resin are exemplified.

If necessary, the paste layer 8 may include further a solvent, a dispersant, a defoamant, or other additives with the conductive powder 5 and the resin 6 for forming the past.

The conductive powder 5 and the resin 6 for forming the paste are kneaded to prepare the conductive paste 7. And then the conductive paste 7 is applied or printed over the circuit terminals 3a, 3b mounted, on the substrate 4. After the conductive paste 7 is dried, the conductive paste 8 can be produced. The commercially available conductive paste 7 may be used. It is preferable that the conductive paste 7 includes 0-90 weight % of the resin 6 for forming the paste and 10-100 weight % of the conductive powder 5.

As printing methods of the thermosensitive ink 13 or the conductive paste 7, screen printing, offset printing, gravure printing, anastatic printing, pad printing, ink jet printing, and laser printing are exemplified.

The porous material 10 is formed in layer by applying or coating thereof. The porous material 10 does not make the heat-melt substance 11 penetrate before melting by heat, while it makes the melted heat-melt substance 11a after melting by heat absorb or penetrate by capillary. Kinds of the porous material 10 are not limited. Examples of the porous material 10 are a paper material entangled with cellulose fibers such as high-quality paper; art inorganic material, made from an inorganic substance such as cement, ceramics, and porous metallic material; a resin material such as cellular plastic. The porous material 10 may be colored.

It is preferable that an absorbable amount of the porous material 10 is less than a volume of the melted heat-melt substance 11a by heat, and the melted heat-melt substance 11a by heat is hard to stay and easy to penetrate in the porous material 10. Also it is preferable that a whole hole amount of the porous material 10 is less than a volume of the heat-melt substance 11. Those amounts can prevent not to swell the resin 6 for forming the paste while the melted heat-melt substance 11a by heat can be just absorbed in the porous material 10.

The adhesive material 9 can fix the porous material 10 on the paste layer 8, and can make the melted heat-melt substance 11a by heat penetrate. If necessary, the adhesive material 9 is provided. The adhesive material 9 may be applied on a part surface or whole surface of the paste layer 8.

It is preferable that the melted heat-melt substance 11a by heat is hard to stay and easy to penetrate in the adhesive material 9. Examples of the adhesive material 9 are a rubber-type adhesive, an acryl-type adhesive, silicone-type adhesive, poly vinyl-type adhesive, polyurethane-type adhesive, and a composite of some of them. The adhesives are used by printing a net pattern or a polka dot pattern. As the adhesive material 9, commercially available tape-type, sheet-type, liquid-type adhesives may be used. Among of them, extremely thin acryl-type sheets are more preferable.

Thickness of the adhesive material 9 is preferably 100 μm or less, and more preferably 50 μm or less, because it is necessary that the adhesive material 9 makes the melted heat-melt substance 11a by heat penetrate to permeate and disperse into the conductive paste 7. When the thickness of the adhesive material 9 is thin, the temperature control material achieves sufficient temperature response.

In the temperature control material 1, the conductive paste 7 and the porous material 10 may be directly contacted each other without using the adhesive material 9 and with fixing the porous material 10 on the paste layer 8 as shown in FIG. 2(a). Procedures of fixing the porous material 10 on the paste layer 8 are not restricted. For example, the porous material 10 made from a resin material may be coated onto the paste layer 8 in order to fix it. Otherwise, the sheet-type porous material 10 may be directly attached onto the paste layer 8 which is just applied and is not yet solidified in order to fix it.

In the temperature control material 1, the thermosensitive ink layer 14 may be covered with a film 15 as shown in FIG. 2(b). And the other adhesive material 16 and a release paper 17 may be provided on an underside of the base material 2 on which the circuit terminals 3a, 3b are mounted as shown in FIG. 2(c).

Another embodiment of a temperature control material 1 of the present invention is shown in FIG. 3(a) of a schematic cross-section view. As regards a part of the temperature control, material 1 surrounded by a circle, FIG. 3(b) is a schematic enlarged cross-section view inside the circle before heating, and FIG. 3(c) is a schematic enlarged, cross-section view inside the circle after heating, respectively.

As shown in FIG. 3(a). In the temperature control material 1, a paste layer 8 made from a conductive paste 7 including conductive powder 5 and a resin 6 for forming a paste is provided over circuit terminals 3a, 3b mounted on a substrate 4 which have an electronic circuit formed on a base material 2. A layered adhesive material 9 attached and a porous material 10 attached on the paste layer 8 are piled in the order. Further, a heat-melt, substance 11 of pellets, which melts at melting point corresponding to temperature being detected, is rammed dawn on the porous material 10 to form a layer thereof.

As shown in FIG. 3(b), in the temperature control material 1, the respective conductive powder 5 included in the paste layer 8 has junctions each other so as to be conductive respectively. The temperature control material 1 indicates a conductive state under a lower temperature condition than a predetermined temperature at which the heat-melt substance 11 is melted by heat.

When the temperature control material 1 is heated at the predetermined temperature or more, the heat-melt substance 11 is melted by heat and then whole of the melted heat-melt substance 11a is absorbed and permeated into the below porous material 10. And then, it is also permeated into the adhesive material 9, and a layer of the heat-melt substance 11 is disappeared. The melted heat-melt substance 11a penetrated into the porous material 10 and the adhesive material 9 permeates into the paste layer 8 and then swells the resin 6 for forming the paste in the paste layer 8 or infiltrates between the respective conductive powder 5. In consequence, the junctions of the respective conductive powder 5 included in the paste layer 8 is lost by the swelled resin 6 for forming the paste. Finally the temperature control material 1 indicates an insulated or lower-conductive state.

Figure 3:
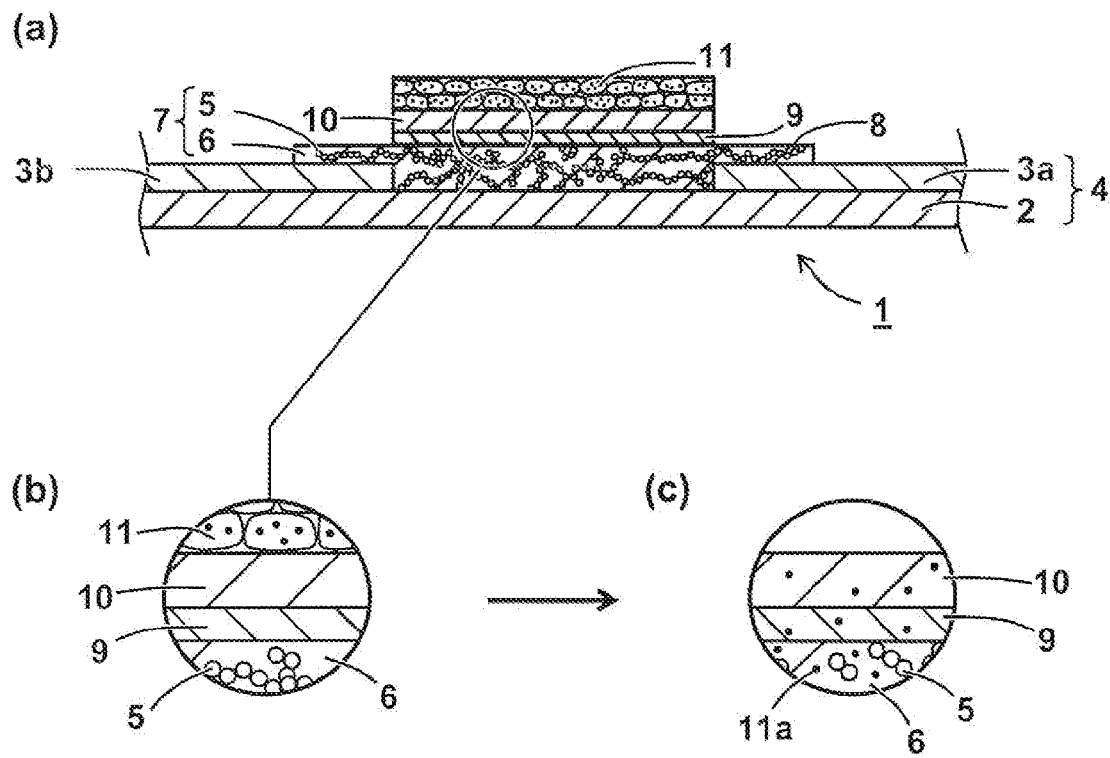
FIG. 3 is a schematic cross-section view showing other temperature control material of the present invention.

As regards the temperature control material 1 of FIG. 3 the heat-melt substance 11 does not restore previous junctions of the respective conductive powder 5, and stays in the conductive paste 3 irreversibly as well as FIG. 1 previously shown. Therefore the insulated or lower-conductive state is kept, even if the temperature is declined or get back to cooler conditions than predetermined temperature again.

Figure 2:
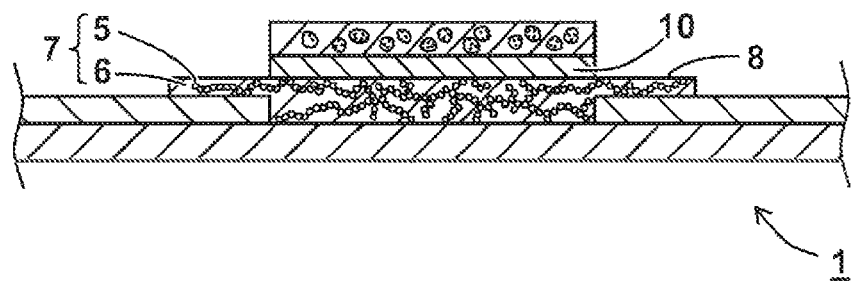
FIG. 2 is a schematic cross-section view showing other temperature control material of the present invention.
Figure 2:
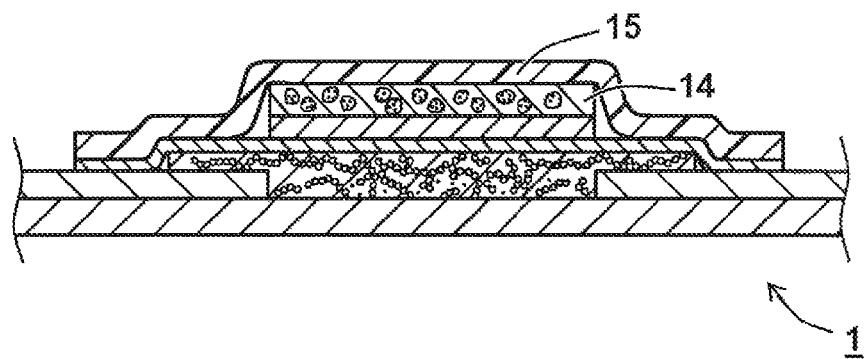
Figure 2:
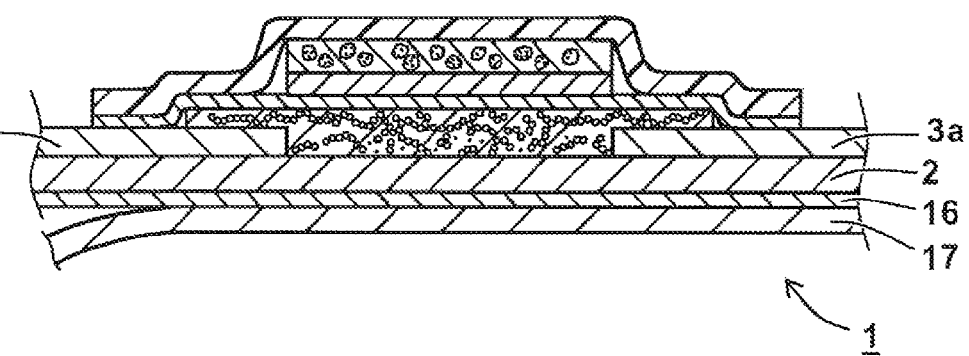

In the temperature control material 1, the granular or powdery heat-melt substance 11 may be piled up to be fixed, on the porous material 10 in the form of layers. Although the heat-melt substance 11 may be formed in shape of layer through melting by heat in the temperature control material 1, a part of the melted heat-melt substance 11a by heat may penetrate the porous material 10 and the adhesive material 9 and then permeate into the paste layer 8 while other part of the melted the heat-melt substance 11a may not penetrate them and may stay as the layer on the porous material 10. As shown in FIG. 2, in other temperature control material 1, a conductive paste 7 and a porous material 10 may be directly contacted without using an adhesive material 9, a heat-melt substance 11 may be covered by a film 15, or an adhesive material 16 and a release paper 17 may be provided on an underside of the base material 2.

The temperature control material 1 of the present invention may detect change of its hue with electrical determination. For example, a heat-melt substance 11 is provided on a colored porous material 10 in a temperature control material 1. A coloring matter in the porous material 10 is masked by a solid heat-melt substance 11 under a lower temperature condition than predetermined temperature. When the temperature control material 1 is heated at the predetermined temperature or more, the heat-melt substance 11 is melted by heat and penetrates the porous material. In consequence, the masked coloring matter is appeared, and then the hue thereof changes irreversibly. The melted heat-melt substance 11a by heat stays in the conductive paste 7. Therefore the temperature control material 1 does not back to the hue of previous color before the change, even if temperature is cooled dawn after the change of the color. On the other hand, in a temperature control material 1 comprising a coloring matter in a thermosensitive ink layer 14, a solid heat-melt substance 11 and the coloring matter are mixed under a lower temperature condition than predetermined temperature, and the coloring matter is masked by the heat-melt substance 11. When the temperature control material 1 is heated at the predetermined temperature or more, the heat-melt substance 11 is melted by heat and then the coloring matter is dispersed or solved and dispersed in the melted heat-melt substance 11a or a surface of the granular or powdery coloring matter is moistened by the melted heat-melt substance 11a to change the hue thereof. The melted heat-melt substance 11a stays in the conductive paste 7 and the temperature control material 1 does not back to the hue of previous color before the change before change as well as the case mentioned above, even if temperature is cooled dawn after the change of the color.

A shape of the temperature control material 1 of the present invention may be a label-shape.

When the temperature control material 1 combines with a RFID tag, a thermosensor tag can be obtained.

Figure 4:
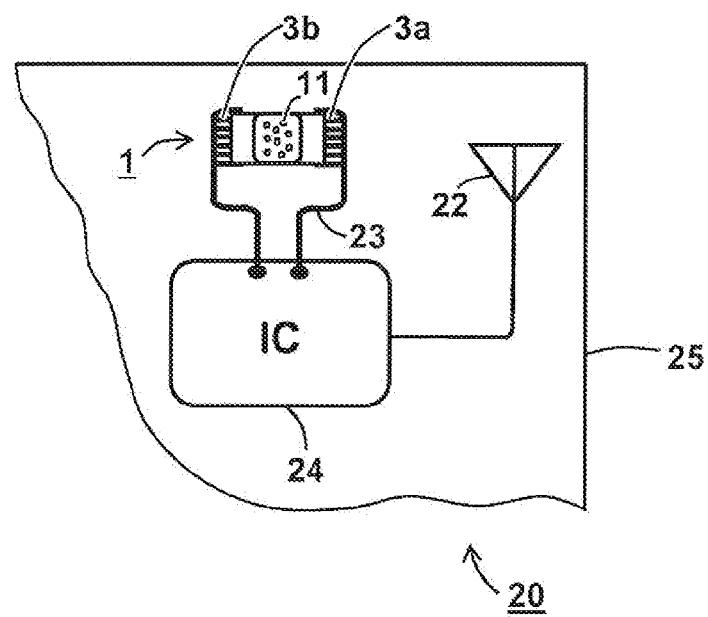
FIG. 4 is a schematic plan view showing the thermosensor tag of the present invention.

For example, in the thermosensor tag 20 as shown in FIG. 4 the temperature control material 1 of the present invention, which keeps the heat-melt substance 11 away from the conductive paste 7 through the porous material 10, is combined with a FRID tag 25 comprising an antenna 22 connected with an IC chip 24 through lead wires 23 on a base material. The temperature control material 1 is provided over circuit terminals 3a, 3b of the IC chip 24.

Figure 5:
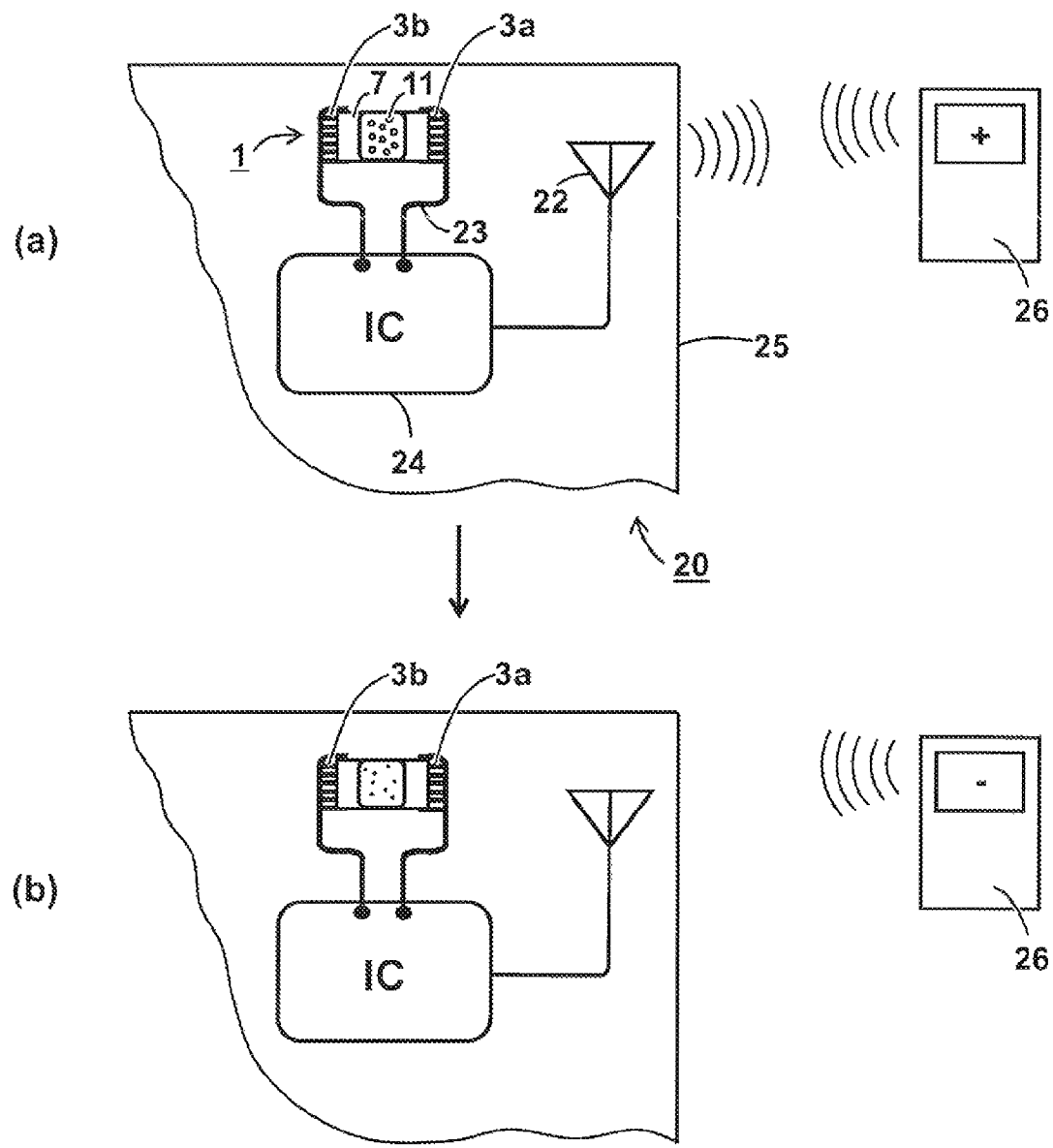
FIG. 5 is a schematic plan view showing the conductive state and the insulated or lower-conductive state of the temperature control material in the thermosensor tag of the present invention.

The temperature control material 1 is a temperature measurement unit, and the thermosensor tag 20 can determine hysteresis whether the temperature reaches the predetermined temperature by intercommunication to a reader/writer 26. For example, the thermosensor tag 20 has a facility which reflects signals for the intercommunication to the reader/writer 26 corresponding to existence or non-existence of conductivity in the circuit connecting to the IC chip 24 used for the RFID tag 25 as shown in FIG 5. The reader/writer 26 indicates a conductive state as a close-loop and a non-conductive state as open-loop.

Figure 6:
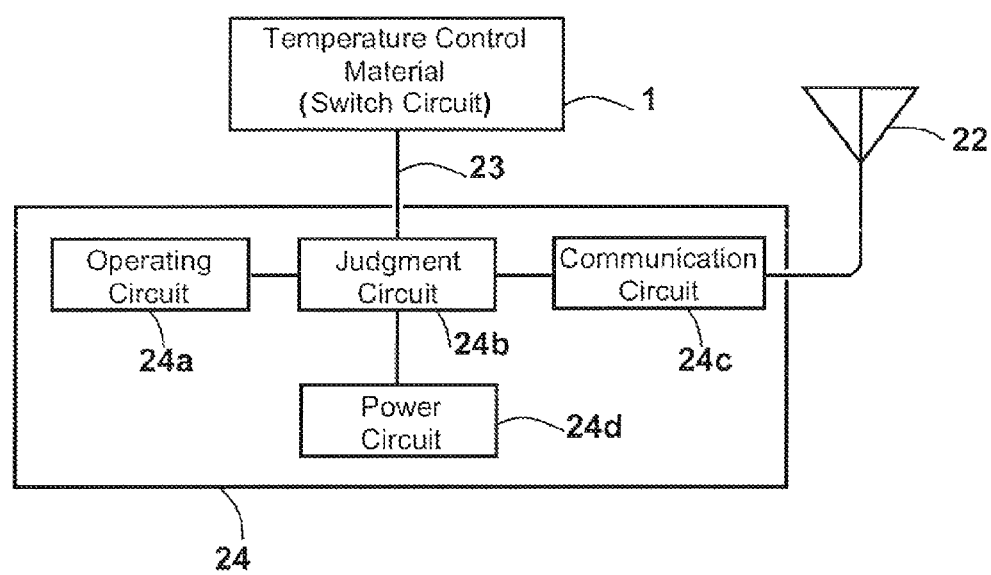
FIG. 6 is a block circuit diagram of the thermosensor tag of the present invention.

As shown in FIG. 6, the IC chip 24 is connected with the temperature, control material 1 as a switch circuit and the antenna 22 through the lead wires 23 respectively. The IC chip 24 has a judgment circuit 24b which is contacted to the temperature control material 1 and judges a conductive state and an insulated or lower-conductive state, an operating circuit 24a which is contacted to the judgment circuit 24b and controls various operations, a communication circuit 24c which is connected to the antenna 22 and communicates about the conductive state and the insulated or lower-conductive state of the temperature control material 1, and a power circuit 24d.

The temperature control material 1 provided over the circuit terminals 3a, 3b of the IC chip 24 are in the conductive state, when temperature of the heat-melt substance 11 is under the lower temperature condition than the predetermined temperature. Therefore the circuit terminals 3a, 3b connected to the IC chip 24 has conductivity as shown in FIG. 5(a). When the judgment circuit 24b judges the conductive state of the temperature control material 1, the communication circuit 24c communicates about the conductive state as the close-loop from the antenna 22 to the reader/writer 26 through the wireless intercommunication. The reader/writer 26 displays "+" as conductivity at a conductivity indication display thereof. In this ease, the operating circuit 24a operates normally, because it is not overheated.

On the other hand, when the heat-melt substance 11 is heated over the predetermined temperature, the melted heat-melt substance 11 by heat penetrates the porous material 10 and permeates into the conductive paste 7 and then makes the conductive paste 7 swell. Therefore the temperature control material 1 is in the insulated or lower-conductive state. Also the circuit terminals 3a, 3b connected to the CI chip 24 is in the non-conductive or lower-conductive state as shown in FIG. 5(b). When the judgment circuit 24b judges thus state, operation of the operating circuit 24a is stopped by the judgment circuit 24b because the operating circuit 24a may not operate normally due to overheating. And the communication circuit 24c communicates about the non-conductive or lower-conductive state as the open-loop from the antenna 22 to the reader/writer 26 through the wireless intercommunication. The reader/writer 26 displays "-" as non-conductivity at the conductivity indication display thereof.

It is preferable that the RFID tag 25 is a passive-type RFID tag, because it can hold temperature detection performance almost permanently due to passive.

The thermosensor tag 20 of the present invention is disposable, because the temperature control material 1 has the irreversible temperature detection performance. Although the embodiment of the thermosensor tag 20 having one temperature control material 1 as the temperature determination unit, it may have plural temperature control materials 1. And the thermosensor tag 20 may have color change performance by using the temperature control materials 1 which combines electrical determination with change of hue thereof.

A shape of the thermosensor tag 20 may be a label shape.

Next, a method for manufacturing the thermosensor tag 20 is explained, referring FIG. 7. As shown in FIG. 7(a), the antenna 22 on the base material as a film, the IC chip 24, and the RFID tag 25 connected to the circuit terminals 3a, 3b of the IC chip 24 through lead wires 23 are used. As shown in FIG. 7(b), the conductive paste 7 including the conductive powder 5 and the resin 6 for forming the paste is applied or printed over the circuit terminals 3a, 3b, and then it is dried. The adhesive material 9 is applied onto the conductive paste 7. Paper as the porous material 10 is provided thereon. Further, the heat-melt substance 11 is piled up in the form of layers to prepare the temperature control material 1. Finally a protective film 27 is stuck thereon so as to protect whole surface of the IC tag 25 to obtain the thermosensor tag 20 mounting the temperature control material 1 over the circuit terminals 3a, 3b as show in FIG. 7(c).

Methods for manufacturing the thermosensor tag 20 are not restricted, and they can be chosen according to the features of the temperature control material 1. Although the embodiment case where the heat-melt substance 11 configuring the temperature control material 1 is directly piled up is explained, the thermosensor tag 20 may be produced by applying or printing the thermosensitive ink 13 including the heat-melt substance 11 and the ink vehicle 12 to prepare the temperature control material 1. Otherwise, the thermosensor tag 20 may be produced by applying a resin material as the porous material 10 on the conductive paste 7 without using the adhesive material 9 to prepare the temperature control material 1.

Embodiments

Embodiments of a temperature control material and a thermosensor tag using it of the present invention will be precisely explained hereinafter, but the scope of the present invention is not limited to these embodiments.

EXAMPLE 1

Carbon black powder (5 pails by weight; available from Mitsubishi Chemical Corporation; item code #3230B), butyl rubber resin (10 parts by weight), and xylene solvent (85 parts by weight) were kneaded to prepare a conductive paste 7. The conductive paste 7 was applied over circuit terminals 3a, 3b on a base material 4 by screen printing, and then it was dried. An adhesive material 9 was transferred on an upper surface of the conductive paste 7 by using an adhesive transfer tape (available from Sumitomo 3M Limited; item code 467MP). A heat-melt substance 11 of palmitic acid (60 parts by weight; melting point ca. 60° C.), a polyvinyl alcohol resin (2 parts by weight; partially saponified; polymerization degree ca, 1000), and pure water (38 parts by weight) were kneaded to prepare a thermosensitive ink 13 beforehand. The thermosensitive ink 13 was applied on red high-quality paper (50 μm) as a porous material 10 by coater printing (300 μm), and then it was dried. After cutting out it, paper applying the heat-melt substance was prepared. The paper applying the heat-melt substance was stuck onto the adhesive material 9 on upper conductive paste 7.

COMPARATIVE EXAMPLE 1

The conductive paste as well as Example 1 was applied over circuit terminals on a base material by screen printing, and then it was dried. The thermosensitive ink as well as Example 1 was applied onto upper surface of the conductive paste by coater printing (300 μm), and then it was dried.

COMPARATIVE EXAMPLE 2

Silver powder (50 parts by weight; available from Kojima Chemicals Co., Ltd.), butyl rubber resin (5 parts by weight), and xylene solvent (45 parts by weight) were kneaded to prepare a conductive paste. Using it, the similar structure was prepared as well as the Example 1.

EXAMPLE 2

Using samples of Example 1, Comparative Examples 1 and 2 electric resistance values of the circuit terminals 3a, 3b were de terminated according to temperature and time. The samples of Example 1, Comparative Examples 1 and 2 were stored in a thermostat bath at 50° C., and the electric resistance values thereof were determined with time. The results thereof are shown in below Table 1. Although the electric resistance values of Example 1 were increased a little during 0 hour to 1000 hours of heating time, change ratio thereof was within 50%. On the other hand, the values of Comparative Example 1 were over 50 MΩ after 25 hours of heating time, and change ratio thereof was over 20000% (it was over 50 MΩ as a threshold limit value of measure for a measurement apparatus). And the electric resistance values of Comparative Example 2 were considerably increased during 0 hour to 1000 hours of heating time, and change ratio thereof was over 5000%.

TABLE 1

| | Heating Time | | | |
|---|---|---|---|---|
| | 0 hour | 100 hours | 500 hours | 1000 hours |
| Example 1 | 213 kΩ | 251 kΩ | 279 kΩ | 295 kΩ |
| Comparative Example 1 | 201 kΩ | over 50 MΩ | over 50 MΩ | over 50 MΩ |
| Comparative Example 2 | 14 Ω | 148 Ω | 488 Ω | 817 Ω |

COMPARATIVE EXAMPLE 3

The conductive paste as well as Example 1 was applied over circuit terminals on a base material by screen printing and then it was dried. The thermosensitive ink as well as Example 1 was applied at a portion apart ca. 1 mm from the conductive paste by coater printing (300 μm), and then it was dried.

EXAMPLE 3

Change of conductivity of samples of Example 1 and Comparative Example 3 were evaluated. The samples of Example 1 and Comparative Example 3 were put on a hot plate, and the hot plate heats them from 25° C. to 55° C. and 65° C. at heat ratio of ca. 1° C./min. Number of the samples having conductivity (electric resistance value: 2 MΩ or less) before heating were counted, and number of the samples having no conductivity (electric resistance value: 20 MΩ or more) by the change after heating were counted. The result shows in below Table 2. When they were heated to 55° C., the conductivity of the samples of Example 1 and Comparative Example 3 were not varied and the results were 0 sample/100 samples respectively. When they were heated to 65° C., 100 samples/100 samples of Example 1 change the conductivity thereof and 67 samples/100 samples of Comparative Example 3 change the conductivity respectively.

TABLE 2

| | Number of Samples varying Conductivity | |
|---|---|---|
| | Heated to 55° C. | Heated to 65° C. |
| Example 1 | 0 sample/100 samples | 100 samples/100 samples |
| Comparative Example 3 | 0 sample/100 samples | 67 samples/100 samples |

EXAMPLE 4

An inlay-type RFID tag 25 (supported for UHF band; IC chip; available from NXP Corporation; UCODE product family G2iM+; threshold for existence or non-existence of conductivity: existence of conductivity (2 MΩ or less), non-existence of conductivity (20 MΩ or more)) as shown in FIG. 4 was used. The temperature control material 1 was provided over the circuit terminals 3a, 3b connecting to the IC chip 24 in the RFID tag 25 to prepare the similar structure as well as Example 1.

EXAMPLE 5

Temperature detection performance of the thermosensor tag 20 providing the temperature control material 1 on the RFID tag 25 was assessed. When state conditions of the temperature control material 1 prepared in Example 4 at 25° C. were intercommunicated by using the-reader/writer 26, it indicated that the circuit terminals 3a, 3b was in the conductive state (2 MΩ or less). After the temperature control material 1 prepared in Example 4 was put on a hot plate and the hot plate was heated from 25° C. to 55° C. and 65° C. at heat ratio of ca. 1° C./min. When state conditions thereof were intercommunicated by using the reader/writer 26 again, number of the samples having no conductivity (electric resistance value: 20 MΩ or more) by change were counted. The result shows in below Table 3. When they were heated to 55° C., the temperature control material 1 of Example 4 indicated that it was in conductive state and the results varying the conductivity were 0 sample/100 samples. When they were heated to 65° C, the temperature control material 1 of Example 4 indicated that it was in non-conductive state and the results varying the conductivity were 100 sample/100 samples.

TABLE 3

| | Number of Samples varying Conductivity | |
|---|---|---|
| | Heated to 55° C. | Heated to 65° C. |
| Example 4 | 0 sample/100 samples | 100 samples/100 samples |

Next, temperature control materials or thermosensor tags using it with/without an adhesive material are compared respectively. When the adhesive material is provided, the temperature control material had more excellent synefgetic effect by both of physical barrier of the adhesive material and a porous material as shown below.

EXAMPLE 6

A temperature control material, which, did not apply the present invention, was prepared as well as Example 1 except for using no adhesive material between, paper applying a heat-melt substance and a conductive paste and coating with PET50APL SIN (available from Lintec Corporation; trade name) as a coating film in order not to stir the paper applying the heat-melt substance. Concretely, the conductive paste prepared in Example 1 was applied over circuit terminals on a base material by screen printing, and then it was dried. The paper applying a heat-melt substance prepared as well as Example 1 was put on an upper surface of the conductive paste. The paper applying the heat-melt substance was fixed on the base material by sticking a coating film over a whole surface of the base material at a circuit side so as to cover the paper applying the heat-melt, substance and not to stir it. Thereby, the temperature control material of Example 6 was prepared.

EXAMPLE 7

For standardizing condition with one of Example 6 except for using an adhesive material, the temperature control material, of Example 1 was used, and the paper applying the heat-melt substance was fixed on the base material by sticking a coating film over a whole surface of the base material at a circuit side. Thereby, the temperature control material was prepared as similar as Example 6.

EXAMPLE 8

After acceleration tests for samples of Examples 6 and 7 were run in order to evaluate degree of deterioration thereof, electric resistance values of the circuit terminals 3a, 3b were determined according to temperature and time. The samples of Examples 6 and 7 were stored in a thermostat bath at 50° C., and the electric resistance values thereof were determined with time. The results thereof are shown in below Table 4. Although the electric resistance values of Example 7 were increased a little during 0 hour to 150 hours of heating time, change ratio thereof was within 20%, and therefore the samples had high reliability and certainty. On the other hand, change ratio of Example 6 was over 90% after 150 hours. Although the reliability and certainty of Example 6 were lower in some degree than ones of Example 7, the samples of Example 6 have practicable level.

TABLE 4

| | Heating Time | | | |
|---|---|---|---|---|
| | 0 hour | 50 hours | 100 hours | 150 hours |
| Example 6 | 208 kΩ | 331 kΩ | 385 kΩ | 401 kΩ |
| Example 7 | 201 kΩ | 219 kΩ | 229 kΩ | 235 kΩ |

EXAMPLE 9

For assessing temperature detection performance of the temperature control materials of Examples 6 and 7 at desired temperature, change of conductivity of samples of Examples 6 and 7 at 65° C. of the desired temperature. The temperature control materials of samples of Examples 6 and 7 were put on a hot plate and the hot plate was heated from 25° C. to 65° C. at heat ratio of ca. 1° C./min. Number of the samples having conductivity (electric resistance value: 2 MΩ or less) before heating were counted, and having no conductivity (electric resistance value: 20 MΩ or more) by the change after heat were counted. The result shows in below Table 5, 10 samples/10 samples of the temperature control material of Example 7 change the conductivity, and therefore the samples of Example 7 have high reliability and certainty. On the other hand, when the temperature control materials of Example 6 were heated from 25° C. to 65° C. by the hot plate at heat ratio of ca. 1° C./min, 1 sample/10 samples thereof changes the conductivity. However, when the temperature control materials of Example 6 were heated from 25° C. to 65° C. by the hot plate at heat ratio of ca. 1° C./min and then kept to heat at 65 65° C. for 1 hour, 10 samples/10 samples thereof change the conductivity and therefore the samples had high reliability and certainty for temperature control of stability with time under thermostatic heating.

TABLE 5

| | Number of Samples varying Conductivity Heated to 65° C. | Number of Samples varying Conductivity Heated to 65° C. and Thermostatic Heating (1 hour) |
|---|---|---|
| Example 6 | 0 sample/10 samples | 10 samples/10 samples |
| Example 7 | 10 samples/10 samples | 10 samples/10 samples |

As mentioned above, the temperature control material applying the present invention prevents unexpected migration of the heat-melt substance and does not make sensitivity decline during storage for long time below predetermined temperature, while in use, or under unexpected low-temperature heating.

Industrial Applicability

The temperature control material 1 is used for a thermal fuse as a material for preventing overheat of electric appliances or batteries. The temperature control material is mounted on the RFID tag using radio wave and used for a sensor tag for temperature control.

Explanations of Letters or Numerals

1: temperature control material, 2: base material, 3a,3b: circuit terminal, 4: substrate, 5: conductive powder, 6: resin for forming paste, 7: conductive paste, 8: paste layer, 9: adhesive material, 10: porous material, 11: heat-melt substance before melting by heat, 11a: heat-melt substance after melting by heat, 12: ink vehicle; 13: thermosensitive ink, 14: thermosensitive ink layer, 15: film, 16: adhesive material, 17: release paper, 20: thermosensor tag, 22: antenna, 23: lead wire, 24: IC chip, 24*a*: operating circuit, 24*b*: judgment circuit, 24*c*: communication circuit, 24*d*: power circuit, 25: RFID tag, 26: reader/writer, 27: protective film

What is claimed is:

1. A temperature control material comprising a heat-melt substance which melts by heat at a melting point according to a temperature being, detected, and a conductive paste which includes conductive powder,
    wherein the temperature control material is in a conductive state by the conductive paste before reaching the temperature being detected and melting of the heat-melt substance which is kept away from the conductive paste through a porous material and a layered adhesive material attached to the conductive paste,
    wherein the porous material is provided onto the layered adhesive material on the conductive paste and the heat-melt substance is stacked on the porous material, and
    wherein the temperature control material is able to change from the conductive state so as to be in an insulated or lower-conductive state of the temperature control material after the heat-melt substance is melted over a melting point thereof and penetrates the porous material to irreversibly permeate and/or disperse into the conductive paste through the layered adhesive material in a heat-melt state over the melting point of the heat-melt substance, thereby eliminating junctions of the conductive powder by swelling the conductive paste and infiltrating between the conductive powder.

2. The temperature control material according to claim 1, wherein a thermosensitive ink layer including the heat-melt substance and a paste layer formed by the conductive paste are kept away through the porous material and piled on each other.

3. The temperature control material according to claim 1, wherein the porous material is a paper material, an inorganic material, or a plastic material.

4. The temperature control material according to claim 1, wherein the conductive powder is at least one selected from carbon black powder and carbon nanotube powder.

5. The temperature control material according to claim 1, wherein the heat-melt substance is at least one selected from an aliphatic acid derivative, an aromatic carboxylic acid derivative, an alcohol derivative, an ether derivative, an aldehyde derivative, a ketone derivative, an amine derivative, an amide derivative, a nitrile derivative, a hydrocarbon derivative, an aromatic compound, a thiol derivative, and a sulfide derivative.

6. The temperature control material according to claim 1, wherein a resin for forming the paste included in the conductive paste is at least one selected from a cellulose-type resin, an acryl-type resin, an epoxy resin, a vinyl-type resin, an imide-type resin, an amide-type resin, a butyral-type resin, a nylon-type resin, and a rubber-type compound.

7. A thermosensor tag comprising the temperature control material according to claim 1,
    the temperature control material is mounted onto circuit terminals of an individual identification tag.

8. The temperature control material according to claim 1, wherein the melted heat-melt substance by heat stays and easily penetrates in the adhesive material,
    and the adhesive material is selected from a rubber-type adhesive, an acryl-type adhesive, silicone-type adhesive, polyvinyl-type adhesive, polyurethane-type adhesive, and a composite of any of them.

* * * * *